United States Patent [19]

Briscoe et al.

[11] 4,141,407
[45] Feb. 27, 1979

[54] POWER DEMAND LIMITING CIRCUIT

[76] Inventors: Harry H. Briscoe, Rte. 10, Burnett Ferry Rd.; John L. Pillsbury, 106 E. Valley Rd., both of Rome, Ga. 30161

[21] Appl. No.: 782,358

[22] Filed: Mar. 29, 1977

Related U.S. Application Data

[63] Continuation of Ser. No. 597,423, Jul. 21, 1975, abandoned.

[51] Int. Cl.$^2$ ............................................. H02J 13/00
[52] U.S. Cl. ...................................... 165/12; 62/231; 219/485; 307/35; 307/39
[58] Field of Search ................... 165/12; 307/34, 35, 307/39, 117; 219/485; 62/231

[56] References Cited

U.S. PATENT DOCUMENTS

| | | | |
|---|---|---|---|
| 2,771,558 | 11/1956 | Young | 307/35 |
| 2,789,197 | 4/1957 | Boehm | 307/35 X |
| 3,521,077 | 7/1970 | Buenzli | 307/31 |
| 3,714,453 | 1/1973 | Delisle et al. | 307/39 |
| 3,862,430 | 1/1975 | Lenhart et al. | 307/35 |
| 3,901,308 | 8/1975 | Berger | 219/485 X |
| 3,925,680 | 12/1975 | Dixon | 307/39 |
| 3,970,861 | 7/1976 | McCollum | 307/35 |
| 4,027,171 | 5/1977 | Browder | 307/39 |

*Primary Examiner*—Charles J. Myhre
*Assistant Examiner*—Margaret LaTulip
*Attorney, Agent, or Firm*—Newton, Hopkins & Ormsby

[57] ABSTRACT

A power demand limiting circuit is disclosed comprising air temperature control apparatus coupled with a municipal source of electric current through a thermoresponsive switch, through a meter having means for measuring maximum power demand for any period in a succession of periods of preselected duration, and through a timer programmed to cycle a timer switch at least once during each of the periods, whereby the air temperature control apparatus is rendered incapable of demanding power continuously throughout any of the metered periods.

20 Claims, 1 Drawing Figure

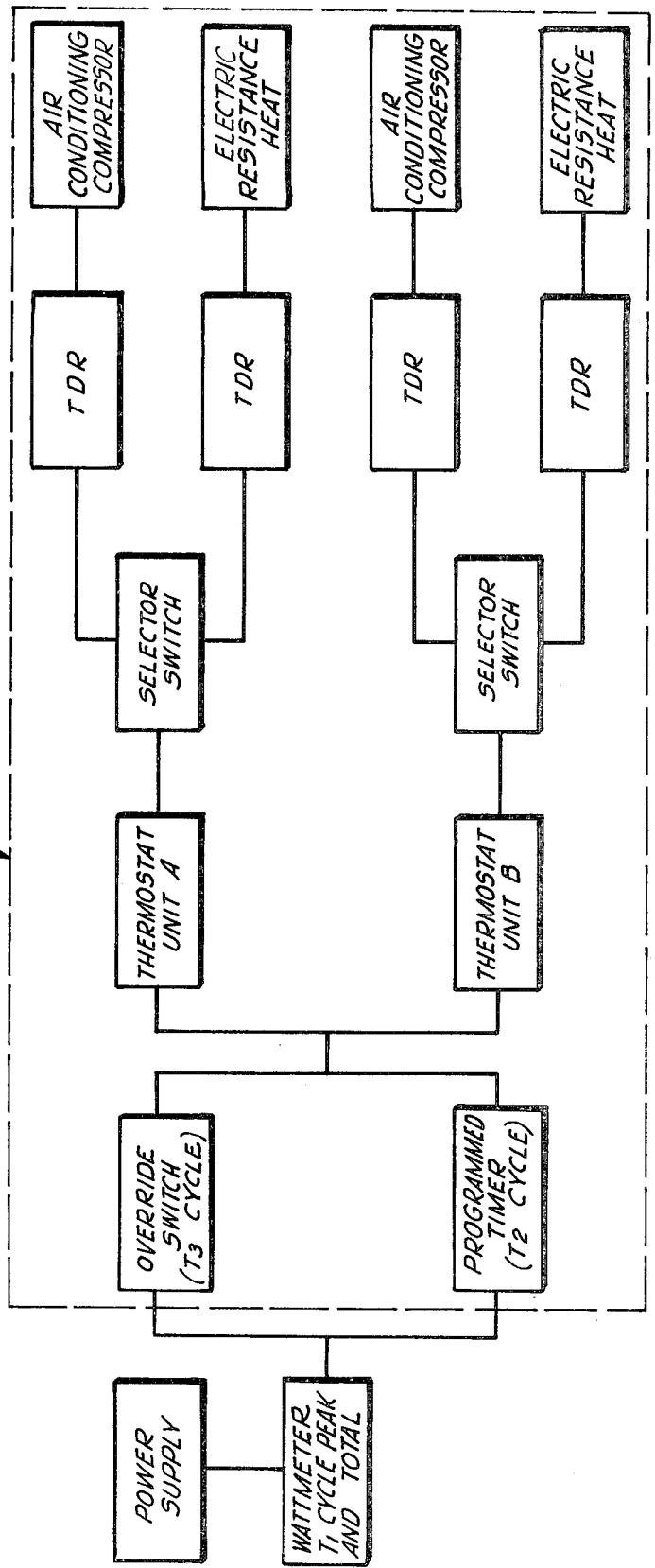

POWER DEMAND LIMITING CIRCUIT

This is a continuation of application Ser. No. 597,423 filed July 21, 1975, now abandoned.

BACKGROUND OF THE INVENTION

Consumers of electrical power today are often charged by electrical utilities for both total power consumption during a billing period as well as for peak demand. This charge for peak demand is made irrespective of actual consumption made by the consumer during any specific period. The justification for this charge rests in the necessity of the utility having to have the resources available to provide power during peak demand periods. In other words, it compensates the utility company for having to have the capacity available to service their customers during brief peak demand periods which capacity may remain idle during the remaining periods of each day and month.

Though billing periods of power companies normally cover a substantially long period of time such as a month, peak demand is calculated on a relatively short period of time such as a quarter or half hour basis. Accordingly, utility companies meter both the total power supplied to their customers during each billing period as well as the maximum power delivered during any brief period in a succession of periods that cumulatively form the billing period. The maximum demand recorded during any of these brief periods in any one month is then imputed into a billing formula, exemplary of which is:

$$\text{Billing Charge} = \left[ KW \cdot T_1 \right]\left[ \begin{array}{c}\text{Rate}\\\text{charge}\end{array} \right] + \left[ \max \int_0^{T_2} KW \right]\left[ \begin{array}{c}\text{Demand}\\\text{charge}\end{array} \right]$$

where $T_2$ is the aforementioned relative brief period of time such as a quarter hour or half hour and $T_1$ is the relative long billing period such as a month.

Typically, the electrical load that imposes the greatest demand for electricity for the majority of utility company customers is their temperature control systems, be it an air conditioning or electrical heating unit. Thus, on hot summer days, air conditioners usually account for peak demand of customers whereas in winter their heaters account for peak demand. These temperature control units are themselves ordinarily controlled by thermostats which cyclically couple the system with line voltage dependent upon sensed temperatures at which they are set to respond. Their control function therefore is eventually divorced from the just described method or formula by which their consumption cost is calculated.

Accordingly, it is the general object of the present invention to provide means for limiting peak power demand.

More specifically, it is an object of the present invention to provide an electrical circuit for limiting peak power demand of air temperature control systems such as air conditioning and electrical heating systems.

Another object of the invention is to provide a power demand limiting circuit of the type described which is easily incorporated into preconstructed circuits supplying power to air temperature control systems.

Yet another object of the invention is to provide a power demand limiting circuit of the type described which may be selectively activated and deactivated with facility.

SUMMARY OF THE INVENTION

In one form of the invention a power demand limiting circuit is provided comprising air temperature control apparatus coupled with a municipal source of electric current through a thermo-responsive switch, through a meter having means for measuring maximum power demand for any period in a succession of periods of preselected duration, and through a timer programmed to cycle a timer switch at least once during each of the periods whereby the air temperature control apparatus is rendered incapable of demanding power continuously throughout any of the metered periods.

In another form of the invention a power demand limiting circuit is provided for limiting peak power demand of an air temperature control system adapted to be coupled with a municipal power source through metering means that meters the maximum power demand during any period in a succession of periods of the same duration. The power demand limiting circuit comprises circuit means for coupling the air temperature control system with the municipal power supply serially through a pair of switches. One of the switches comprises a thermostat responsive to the temperature of air controlled by the air temperature control system while the other switch comprises a timer programmed to cycle a timer switch on and off at least once during each period in the succession of periods.

BRIEF DESCRIPTION OF THE DRAWINGS

The drawing is a block diagram of a power demand limiting circuit embodying principles of the present invention in a preferred form.

DESCRIPTION OF THE PREFERRED EMBODIMENT

Referring now in more detail to the drawing, a power demand limiting circuit is shown in block diagram form for limiting power to an air temperature control system of a building having two spacial areas independently serviced by two air conditioning units and two electrical resistance heating units. Power is supplied to these units from a municipal power source through a meter. The meter measures both total power consumption in kilowatt-hours for billing periods of duration $T_1$ as well as maximum power demand measured during the succession of time periods $T_2$ that form $T_1$.

With continued reference to the drawing the air conditioner compressors and the electrical resistance heating elements are both coupled to a municipal power supply by power circuits through time delay relays that prevent all elements in the compressors and heaters from being simultaneously energized and thereby creating substantial surge currents. A selector switch is provided for each spacial unit A and B whereby air conditioning may be selected in summer by the customer and heating in the winter. Thermostats are also provided independently for both units A and B. A programmed timer is also provided in the power circuit in series with the thermostats which timer is programmed to make a complete switching cycle in each period $T_2$ for which peak power demand is metered. An override switch is further provided in parallel with the programmed timer to deenergize the timer by short-circuiting it upon switch closure. From the timer the power circuit extends to the municipal power supply through the previously described meter that measures total power consumption during the billing period $T_1$ plus peak demand during the succession of $T_2$ periods.

In operation, the timer is preferably programmed to make but one complete cycle during each successive period for which the meter measures maximum power consumption. For example, if the local utility measures peak power demand every thirty minutes the timer may be programmed to cycle the timer switch on or closed for, say, twenty minutes followed by an open or deenergized period of ten minutes. In this manner the customer is assured that his air temperature control systems will never be energized for more than two-thirds of any demand period $T_2$ and thereby be assured that peak demand never surpasses two-thirds maximum. Therefore, even on a hot summer day when the thermostats may energize the air conditioning compressors almost continuously, the programmed timer prevents the compressors from being energized more than two-thirds of any one demand period time $T_2$. Upon the arrival of autumn and cooler days the customer may close the override switch and thereby deactivate the power demand limiting feature. Thus, typically the override switch is cycled seasonally, or every three months for a $T_3$ cycle. In the override mode the air conditioning compressors or electrical heating units are controlled just by the thermostats, selector switches and time delay relays. During this time moderate ambient temperatures themselves normally prevent any continuous demand for air temperature control from arising and thus maximum peak demand from also arising.

It should be understood that the just described embodiment merely illustrates the principle of the invention in a preferred form. Many modifications, additions and deletions may, of course, be made thereto without departing from the spirit and scope of the invention as set forth in the following claims.

What is claimed is:

1. In a consumer's electrical circuit having an electrical load coupled with a municipal source of electric current through meter means for metering power consumption during a time period of relatively long duration and for metering maximum power demand during any time period in a succession of periods of relatively short duration occurring during the time period of relatively long duration, the improvement comprising means for allowing the consumer to control his billing rate insofar as determined by maximum power demand during said periods of short duration, comprising programmable timer means for interrupting the coupling of the electrical load with the municipal source of electric current for a selected time at least once during each of said demand periods of relatively short duration.

2. A power demand limiting circuit for allowing a consumer to control his billing rate by limiting peak power demand by an air temperature control system comprising, in combination, a municipal source of electric current; means for metering maximum power demand during any single demand period in a succession of demand periods of the same preselected duration and which cumulatively constitute a billing period, said metering means coupling said source of electric current with said air temperature control system; and circuit means for coupling said air temperature control system with said municipal source of electric current serially through a pair of switches with one switch means being a thermostat responsive to the temperature of air controlled by said air temperature control system and with the other switch means being a timer programmed to cycle on and off at least once during each period in said succession of demand periods whereby a consumer may control his billing rate by allowing said control system to consume power for a portion only of each period.

3. A power demand limiting circuit in accordance with claim 2 further comprising circuit override switch means connected across said other switch means.

4. A power demand limiting circuit in accordance with claim 2 wherein said metering means further includes means for measuring total power consumption during said succession of periods.

5. A power demand limiting circuit in accordance with claim 2 wherein said air temperature control system comprises an air conditioner compressor.

6. A power demand limiting circuit in accordance with claim 5 wherein said air temperature control system further comprises an electrical resistance heating element, and wherein said power demand limiting circuit further comprises selector switch means for coupling said air conditioner compressor and said electrical resistance heating element alternatively with said municipal source of electric current.

7. A method of allowing a consumer to control his billing rate by limiting peak power demand of an air temperature control system coupled with a municipal power supply through a thermostat switch responsive to the temperature of air controlled by said system, comprising the steps of metering maximum power demand during any demand period in a succession of demand periods of preselected duration and cycling said control system on and off at least once during each demand period in said succession of demand periods whereby said control system may consume power for a portion only of each said demand period.

8. A method as claimed in claim 7 including the step of connecting in said system means to override said cycling step.

9. A method of allowing a consumer to control his billing rate by regulating peak electrical power demand of an air temperature control system coupled through a thermo-responsive switch with a municipal power supply, comprising the step of connecting between said control system and said power supply a meter having means for measuring maximum power demand during any demand period in a succession of periods of preselected duration which cumulatively constitute a billing period during which the customer is billed at a rate dependent upon the power consumed during individual demand periods, and a timer programmed to cycle said control system on and off at least once during each of said periods of preselected duration, whereby said air temperature control system is capable of demanding power for a portion only of each demand period in the succession of periods correspondingly to reduce the customer's billing rate.

10. A method as claimed in claim 9 further comprising the step of connecting an override switch across said timer.

11. A method as claimed in claim 9 wherein said meter further includes means for measuring total power consumption during said succession of periods.

12. A method as claimed in claim 9 wherein said air temperature control system comprises an air conditioner compressor.

13. A method as claimed in claim 12 wherein said air temperature control system further comprises an electrical resistance heating element and wherein said method further includes the step of alternatively coupling said compressor and said heating element with said power supply.

14. A power demand limiting circuit for allowing a consumer to control his billing rate by limiting peak power demand for an electrical system coupled with a municipal power supply and including means for metering maximum power demand during any demand period in a succession of demand periods of preselected duration which cumulatively form a billing period the improvement comprising means for cycling said system on and off for a selected period of time at least once during each demand period in said succession of demand periods.

15. A peak power demand limiting circuit for limiting power demand from an electrical system coupled with a municipal power supply which includes means for measuring power consumption over a complete billing period and means for measuring power consumed during each of a succession of equal, brief time periods which cumulatively form the billing period, said electrical system including demand switch means which may demand power throughout the entirety of any and each given one of said brief time periods whereby the electrical system could consume a maximum amount of power during each said given one of the brief time periods, the improvement which comprises timer means for preventing power consumption by said electrical system for a significant fraction of each said given one of the brief time periods whereby the amount of power which may be consumed by the electrical system during each said given one of the brief time periods is significantly less than said maximum amount.

16. A peak power demand limiting circuit as defined in claim 15 including switch means for selectively overriding said timer means.

17. A peak power demand limiting circuit as defined in claim 15 wherein said electrical system comprises an air conditioning system and said demand switch means is a thermostat.

18. A peak power demand limiting circuit as defined in claim 15 wherein said electrical system comprises an electrical heating system and said demand switch means is a thermostat.

19. In an electrical distribution system servicing a plurality of customers and including first metering means for determining the total electrical power consumption of each customer over a billing period such as a month and second metering means for determining the power consumed by each customer over each of a plurality of successive time periods such as a half hour which cumulatively cover said billing period, whereby each customer may be billed at a rate in accord with the measurement of said second metering means, at least one of said customers having an electrical load which is an air temperature control system provided with an electrical supply line connected with said distribution system and a thermostatically controlled switch for connecting said electrical load to said supply line in response to air temperature control demand, the improvement which comprises:

programmable timer means in said supply line in series with said thermostatically controlled switch for allowing such switch to supply electrical power to said load for a fraction only of each of said time periods, whereby said one customer may control said rate at which he is billed.

20. In an electrical distribution system as defined in claim 19 including override switch means for allowing said one customer to override said timer means when desired.

* * * * *